(12) United States Patent
Davis et al.

(10) Patent No.: US 6,578,701 B1
(45) Date of Patent: Jun. 17, 2003

(54) APPARATUS FOR CLEANING CLIPS ON WEB TRANSPORT DEVICE

(75) Inventors: Arthur Keith Davis, Tryon, NC (US); Derek Scott Kozlowski, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/008,725

(22) Filed: Dec. 7, 2001

(51) Int. Cl.[7] .............................................. B65G 45/16
(52) U.S. Cl. ............................ 198/499; 198/498; 26/93
(58) Field of Search ............................. 26/93; 198/494, 198/497, 498, 499

(56) References Cited

U.S. PATENT DOCUMENTS

| | | | |
|---|---|---|---|
| 2,711,035 A | * | 6/1955 | Pitts ........................ 198/499 X |
| 3,789,975 A | | 2/1974 | Ida et al. |
| 3,913,728 A | * | 10/1975 | Pott ............................ 198/498 |
| 4,176,429 A | | 12/1979 | Rottensteiner |
| 5,159,733 A | | 11/1992 | Fleming, Jr. et al. |
| 5,267,378 A | | 12/1993 | Wellenhofer et al. |
| 5,771,547 A | | 6/1998 | Hommes et al. |

FOREIGN PATENT DOCUMENTS

SU            712331    *  1/1980  ................. 198/498

* cited by examiner

Primary Examiner—James R. Bidwell
(74) Attorney, Agent, or Firm—Terry T. Moyer; Sara M. Current

(57) ABSTRACT

An apparatus for automatically cleaning the clips on a web processing apparatus is described. The apparatus includes a scraper for scraping the web supporting surface of the clips on the web transporting machine, and also desirably includes a clip opener, for facilitating opening of the clip to enable the scraper to easily access the clip web support surface. The scraper is desirably supported in a manner that enables it to move upwards and downwards relative to the web supporting surface of the clips, to account for variations in clip height and positioning. The clip cleaner can be readily applied to existing web processing apparatus, such as tenter frames, and desirably can be selectively moved from an operative position to an inoperative position.

19 Claims, 5 Drawing Sheets

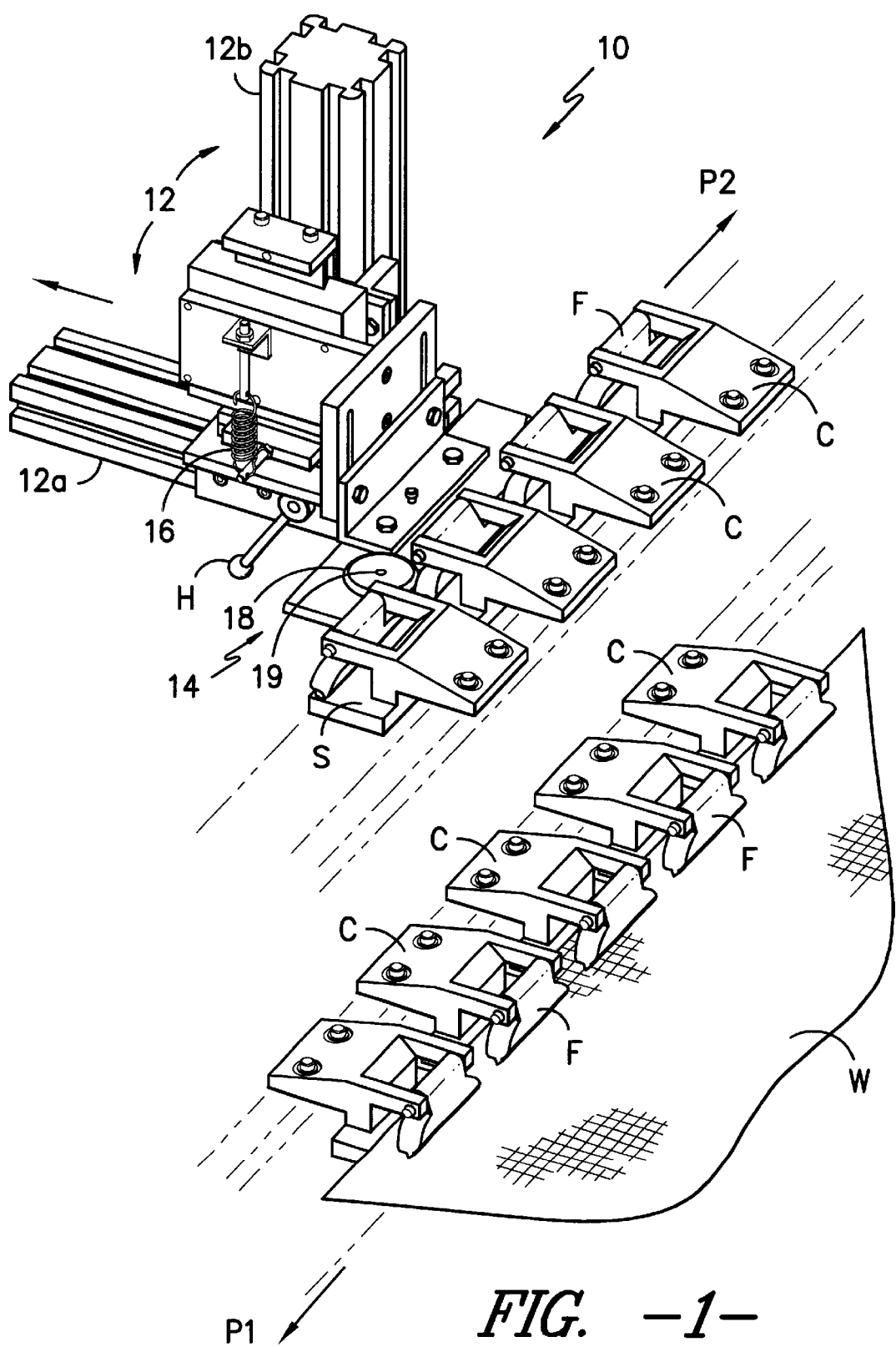
FIG. —1—

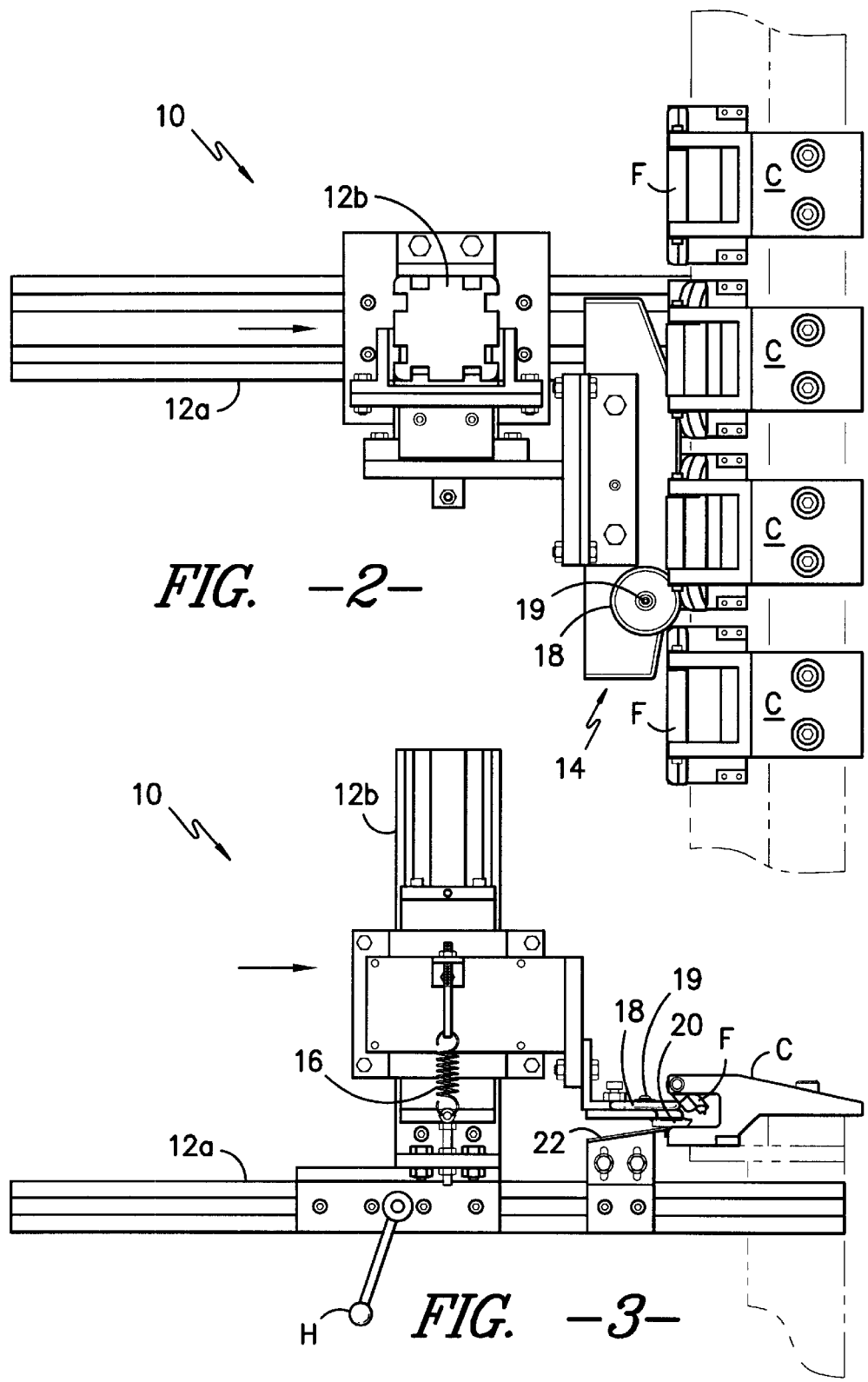

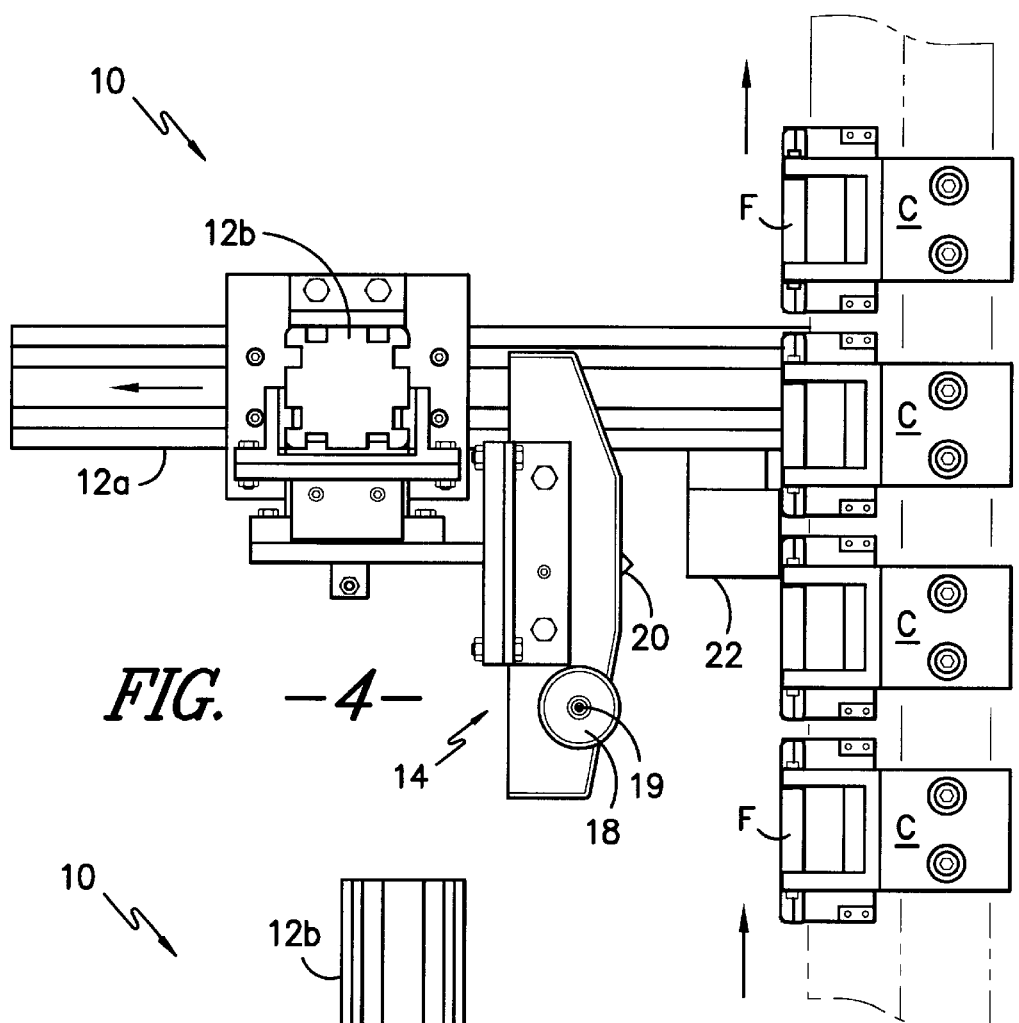
FIG. -4-
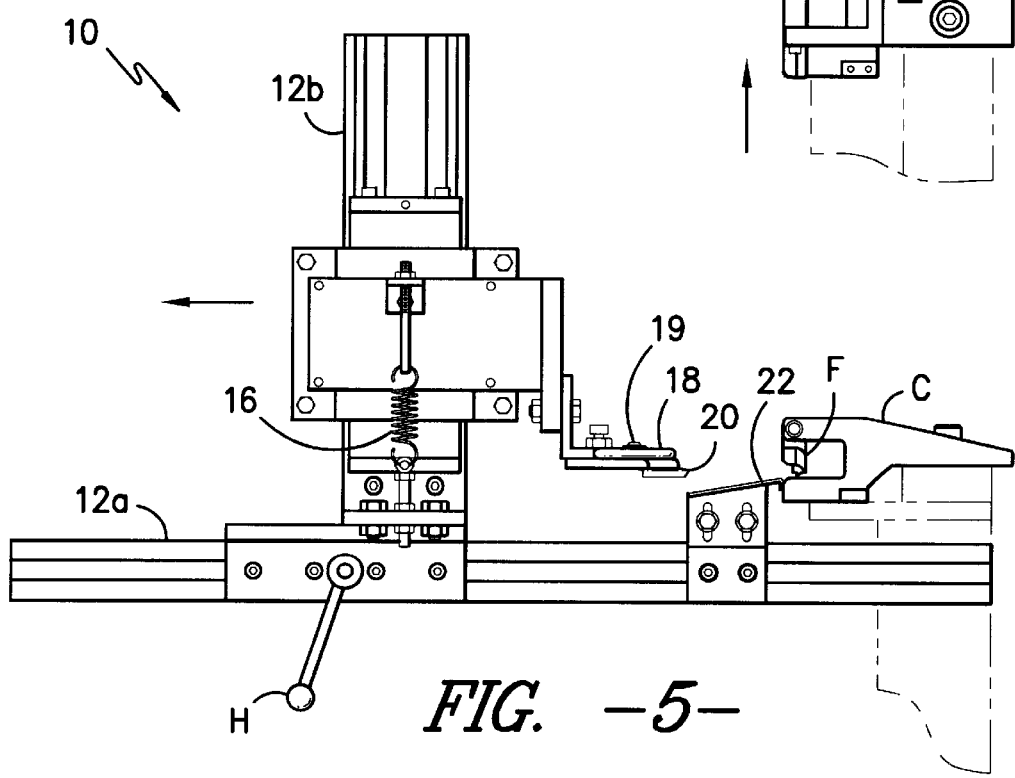
FIG. -5-

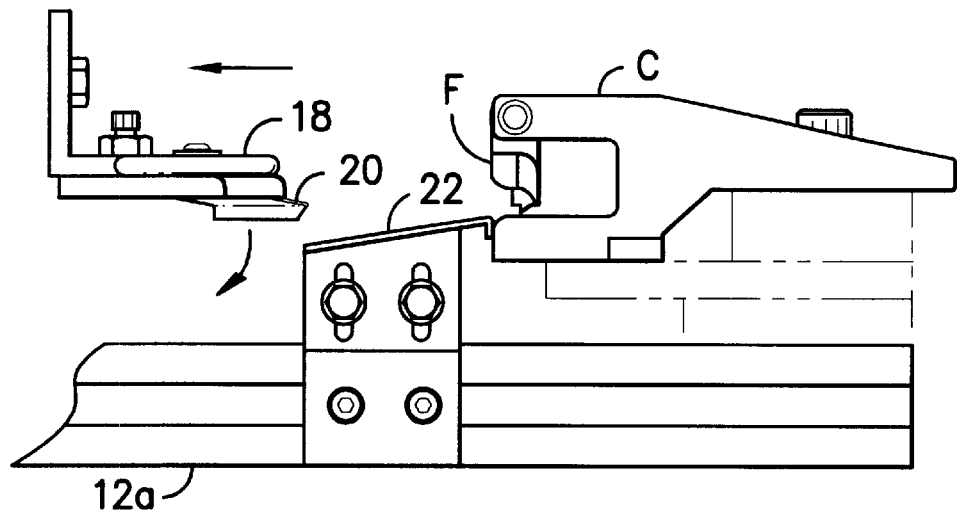
FIG. -6-
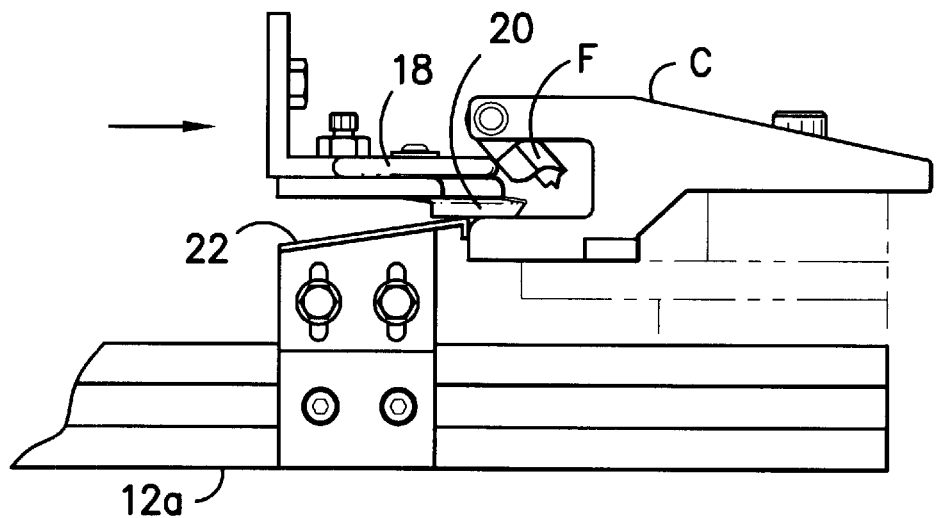
FIG. -7-

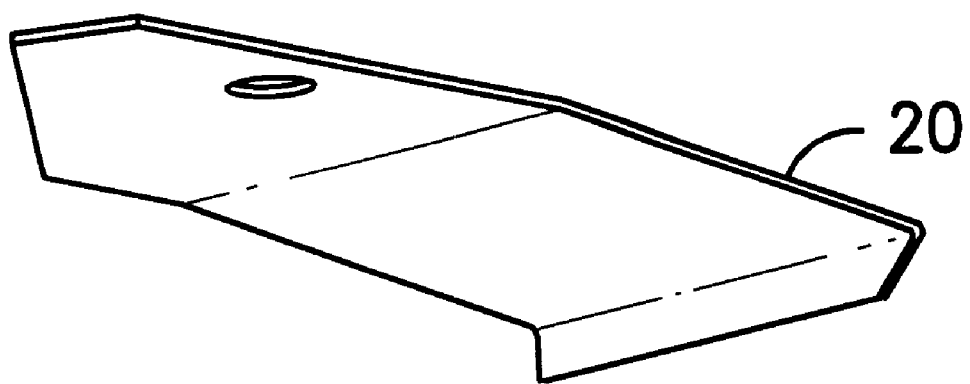
FIG. -8-

APPARATUS FOR CLEANING CLIPS ON WEB TRANSPORT DEVICE

BACKGROUND OF THE INVENTION

The invention is directed to an apparatus for cleaning the clips of a web transporting machine. In particular, the invention is directed to an apparatus for cleaning the clips of web transporting machines of the variety where there can be significant chemical and debris buildup on the clips, such as a tenter frame.

A variety of apparatus exist for transporting and processing webs of material, such as textile fabric webs and the like. Such machines typically include devices for holding the sides of the web, and a means for transporting the web along a predetermined pathway, which is generally through one or more processing stations. One example of such a web processing apparatus is a tenter frame. As will be appreciated by those of ordinary skill in the art, tenter frames are used to dry textile materials, and can be used to control the fabric width by controlling the amount the fabric can shrink when heated during the drying process. Typically, tenter frames include a pair of endless chains on horizontal tracks, which hold the fabric at its edges by pins or clips on the two chains, to thereby hold the fabric at the desired width during drying. Similarly, other web processing machines use clips to retain the edges of the web during processing, to maintain it in a desired position for processing and/or control its width.

The clips typically used on these kinds of machines generally have a lower, flat web supporting portion that is adapted to support the web being processed beneath the web edges (or selvages, as they are known in the textile industry.) The clips also typically have a hinged flap that pivots downwardly toward the web supporting portion, to capture the web edge and retain it tightly in position. The hinged flap is desirably designed to pivot in the direction such that the more a fabric is pulled away from the clip, the more tightly the flap is pulled toward the web supporting portion. In this way, the hinged flap is enabled to tightly secure the web edges, while being relatively easy to open when so desired, by pivoting it in the opposite direction.

One difficulty experienced with such apparatus is that the foreign matter can tend to build up on the clips, and in particular, on the surface of the web supporting portion. Not only can this interfere with the proper closing of the flap and securement of the web (leading to miss-clips and inadequate dimensional setting of the web), but the foreign matter can soil the web being processed, thereby causing off-quality or defects. The problem of clip contamination build-up can be particularly aggregious in the processing of textile materials, where a variety of chemistries and finishes are often provided on the fabrics. Furthermore, since tenter frames are typically operated at elevated temperatures (e.g. from about 150° F. and upwards), it often results that the chemicals and finishes are "baked on", which can make them extremely difficult to remove. As a result, it is generally required that clip contaminants in the textile environment be removed by the manual scraping of the clips with a putty knife. As will be readily appreciated by those of ordinary skill in the art, this has disadvantages in terms of safety, speed, manufacturing efficiencies, and the like.

Attempts have been made to automate clip cleaning. For example, U.S. Pat. No. 4,176,429 to Rottensteiner describes a brush system for cleaning the clips on a tenter frame. The brush cleaning device is designed to move between an operative, clip contacting position, and an inoperative position. While such brushes may be sufficient for certain end uses where the clip contamination is in "free flake" form, it would be insufficient to remove chemistry and finishes in many applications, and in fact, would tend to make it more difficult to remove, in that it has been brushed and compacted onto the clip surface.

Other attempts to free obstructions in tenter clips are described in U.S. Pat. No. 3,789,975 to Ida et al, and U.S. Pat. No. 5,771,547 to Hommes et al. Those patents describe the use of streams of pressurized air to eject foreign matter from the tenter clips. Like the brushing technique described in the Rottensteiner patent, this method would be insufficient for removing baked-on material of the variety described above.

Other methods have generally accepted that clip contamination cannot be sufficiently avoided, and have focused on the identification of contaminant build-up. For example, U.S. Pat. No. 5,159,733 to Fleming, Jr. et al describes a tenter machine having a mechanical arm or a light beam for detecting foreign matter on the clips, in order that the machine operation can be ceased.

With the foregoing in mind, it is therefore an object of the invention to provide an apparatus for the automated cleaning of clips on a web processing apparatus, which will enable the removal of chemicals and finishes such as those encountered in a textile processing environment.

It is also an object of the invention to provide a means for cleaning the clips of a web processing apparatus that can be readily applied to existing equipment, without requiring redesign or modification of the equipment.

It is another advantage of the invention to provide an apparatus that can effectively clean the clips of a web processing machine while the machine is in operation and the clips are moving at high rates of speed.

SUMMARY

To this end, the present invention is directed to an apparatus for cleaning the clips of a web processing apparatus which can be easily applied to any of a variety of web processing devices, and which can remove securely attached debris and contaminants from the web supporting surface of the clips. The apparatus includes a scraper for scraping the web supporting surface of the clips on the web transporting machine, and also desirably includes a clip opener, for facilitating opening of the clips to enable the scraper to easily access the web supporting surface of the clip. The scraper is desirably supported in a manner that enables it to move upwards and downwards relative to the clips in order to accommodate variations in clip positioning.

The clip cleaner is also desirably designed so that it can clean the clips while the web processing device is in operation, and operating at the high speeds typically used during a commercial processing operation.

BRIEF DESCRIPTION OF THE DRAWINGS

FIG. 1 is a partially cut-away environmental view of one embodiment of the present invention;

FIG. 2 is a top view of a clip cleaner of the invention shown in FIG. 1, in its operative position with respect to a web processing device;

FIG. 3 is a side plan view of the apparatus illustrated in FIGS. 1 and 2;

FIG. 4 is a top view of the apparatus illustrated in FIG. 1, showing the clip cleaner in its withdrawn, or non-cleaning position;

FIG. 5 is a side plan view of the apparatus shown in FIG. 4;

FIGS. 6 and 7 are illustrations of a portion of a clip cleaner made according to the invention, illustrated in FIG. 6 with the clip cleaner withdrawn from the clip and in FIG. 7, with the clip cleaner in its operative position; and FIG. 8 is an enlarged perspective view of the underside of a scraper that can be used in connection with the instant invention.

DETAILED DESCRIPTION

In the following detailed description of the invention, specific preferred embodiments of the invention are described to enable a full and complete understanding of the invention. It will be recognized that it is not intended to limit the invention to the particular preferred embodiment described, and although specific terms are employed in describing the invention, such terms are used in a descriptive sense for the purpose of illustration and not for the purpose of limitation. Like numbers are intended to illustrate like elements throughout the figures.

The apparatus has a scraper having a substantially planar edge for contacting the web supporting portions of the clips of a web processing machine, and clearing them of debris and the like. The apparatus also desirably includes a means for facilitating opening of the clips, in order to make the surfaces of the web supporting portions available for the clearing of debris.

The apparatus also is desirably mounted so that it can move slightly as needed to accommodate for slight variations in the position of the web supporting portions of the clips. Also, the clip cleaning apparatus can desirably be selectively moved from an operative clip cleaning position to an inoperative position, where it is not in contact with the clips.

In one aspect of the invention, the means for opening the clips is in the form of an angled ram (not shown) which contacts and pivots the hinged flap F of the clip to its open position, so that the scraper can contact the surface of the web supporting portion S of the clips C without hindrance from the hinged flap portion F. In a preferred embodiment of the invention, the means for opening the clips comprises a rotating wheel 18 (which rotates about a pin or axis 19), as this has been found to provide gentle opening of the clips, and to be more durable than a stationary ram.

With reference to the drawings, FIG. 1 shows a partially cutaway environmental view of an embodiment of the apparatus according to the invention, shown generally at 10. The web processing device in which the clip cleaner 10 is used is shown in partially cut-away form, in order to fully explain the environment of the apparatus. The web processing device in this illustration includes a plurality of clips C, which follow an endless path of travel to transport a web W of material through a processing operation. In the instant case, the clips follow a generally oval-shaped path of travel in which they transport the web along a first path length P1, release the fabric, then turn and return back to a web receiving position via a second path length P2 that parallels the first path length.

The apparatus has a support 12 for supporting the clip cleaner adjacent the web processing apparatus. In the illustrated embodiment of the invention, the support is in the form of a light weight frame on which the clip cleaner can be readily moved from an operative position to an inoperative position, in a manner that will be discussed more completely below. The support 12 is desirably positioned along the return path P2 of the clips, such that cleaning occurs while clips are traveling along the second path length. In this way, the cleaning can be performed while the web processing machine is engaged in the processing of a web, without risking damage to the web as a result of the cleaning process. Furthermore, this enables cleaning to be performed at the process operating speeds, rather than requiring the machine to be taken out of operation for the performance of the clip cleaning function.

In the illustrated embodiment of the invention, the support 12 comprises a horizontal support member 12a and a vertical support member 12b. These support members can be secured directly to the frame of the web processing apparatus, or can be positioned separately, yet proximate the web processing apparatus so as to enable support of the clip cleaning mechanism in a position contacting the clips to be cleaned. (Although described as being "horizontal" and "vertical" support members, it is noted that alternatively oriented supports can be used within the scope of the invention, such as where the clips run in a direction other than horizontally, such as vertical.)

In the illustrated embodiment of the invention, the clip cleaning mechanism and vertical support member 12b are adapted to slide along the horizontal support member 12a by way of handle H. In this way, the clip cleaning mechanism can be slid from an inoperative position, in which it is moved away from the clips to be cleaned, to an operative position, in which the clip cleaning mechanism contacts the clips. It is to be noted, however, that other arrangements for supporting the clip cleaning mechanism are contemplated within the scope of the instant invention; however, it is preferable that the support will enable the selective movement of the clip cleaning mechanism from an operative position to an inoperative position. In addition, it is noted that the support can be constructed in such a way that a single clip cleaner device can be transferred from one web processing machine to another. Furthermore, it is noted that a because a typical web processing machine will have two clip assemblies (i.e. one to hold each side of the web being processed), that it may be desirable to provide an individual clip cleaning mechanism to each of the sides of the web processing machine. Also, the clip cleaner can include means for moving the clip cleaner into an operative position automatically (e.g. for a set period of time), and then moving it to an inoperative position automatically.

The clip cleaning mechanism also desirably includes a means for biasing it against the upper surface of the web supporting portion of the clips when the clip cleaning mechanism is in its operative position, yet allows the mechanism to move upwardly and/or downwardly to a slight extent in order to allow it to account for minor variations in height of the clip lower surfaces. In the illustrated embodiment, the biasing means is in the form of a spring 16, which biases the mechanism downwardly toward the web supporting surfaces of the clips, while enabling it to move within a small range, to account for variations in the height of the clips and the like.

As noted above, the clip cleaning mechanism 14 desirably includes a means for opening the clips, and includes a means for scraping debris from the web supporting portion of the clip. In a preferred form of the invention, the means for opening the clips is in the form of a rotatable wheel 18, which contacts the hinged flap F of a clip as it proceeds along its path of travel and pivots it inwardly to its open position. Alternatively, an angular ram can be used to open the clip hinged flap, though it has been found that the wheel construction has greater durability and provides more gentle clip opening. The clip opener can be manufactured of any type of material desired; however, it is desirable to select a material that will not adversely affect the clips. For example, it has been found that clip openers made from high melt temperature thermoplastics such as nylon, phenolic resin materials, and the like perform well, without damaging the material of the clips themselves. However, the use of other materials in the manufacture of the clip opener are contemplated within the scope of the invention.

As used herein, the term "scraper" is intended to describe a rough, hard and/or sharp device designed to contact the upper surface of the web supporting portion of the clips so as to, chisel off debris which may have become attached to that surface (e.g., in the manner in which old paint is typically scraped off a surface in order to prepare it for painting.) The scraper 20 desirably includes a substantially planar edge, so that complete scraping and cleaning of the surface of the web supporting portion of the clip can be achieved. In a preferred form of the invention, the scraper 20 is in the form of a relatively dull blade of a flexible material. In a particularly preferred form of the invention, the scraper has a bent edge as illustrated in FIG. 8, as this facilitates complete scraping by providing a good flat edge-to-surface contact. The scraper can be made from any type of material desired, but is preferably made from a material designed to be durable and provide good scraping of the clip surfaces, while at the same time minimizing damage and wear to the clips themselves. Where the scraper is made from flexible material, this enables the blade to accommodate for variations in clip positioning while also providing good debris cleaning by virtue of the downward spring force it applies onto the cleaner edge of the scraper. Examples of materials that can be used include, but are not limited to spring steel, annealed steel, stainless steel, and the like.

The scraper 20 is desirably secured on the clip cleaning mechanism such that it is angled with respect to the front edge of the clips to be cleaned, such that the full width of the scraper contacts and scrapes across the upper surface of the web supporting portion of the clips.

The clip cleaning function using the clip cleaner of the instant invention is performed as follows: The clip cleaning mechanism is moved from its inoperative position (such as shown in FIGS. 4 and 5) toward the web processing apparatus (as shown in FIGS. 2 and 3.) As illustrated more clearly in FIGS. 6 and 7, the horizontal support 12*a* is desirably provided with a lift for lifting the scraper onto the clips. In a preferred form of the invention, the lift is in the form of a ramp 22, which peaks proximate the upper surface of the clips of the web processing apparatus. When the clip cleaner mechanism is moved toward its operative position, the ramp 22 serves to ensure that the scraper 20 is pushed to a level high enough that it can clear the front edge of the clip web supporting portion. However, other types of lifts (such as a mechanical lift that lifts the cleaner upward over the clip edge, then lowers it downward onto the clip surface) can be used within the scope of the invention. In this way, it can be ensured that the scraper 20 is properly positioned within the clip so that effective cleaning can be achieved.

The clip opener 18 serves to pivot the hinged flap F of the clip to its open position (as shown in FIG. 7), and the scraper 20 thus contacts the upper surface of the web supporting portion of the clip. As the clips C travel past the clip cleaning mechanism, the scraper 20 thereby scrapes debris and contaminants off of the surface. As noted above, the movement of the clips C can be effected by normal operation of the web processing operation, or it could be performed when the web processing apparatus is not in operation of processing a web. In either event, it has been found that cleaning can be performed at a high rate of speed and efficiency.

In the specification there has been set forth a preferred embodiment of the invention, and although specific terms are employed, they are used in a generic and descriptive sense only and not for purpose of limitation, the scope of the invention being defined in the claims.

We claim:

1. An apparatus for cleaning the clips on a web processing device comprising:

a scraper having a substantially planar edge and means for supporting said scraper proximate the clips of a web processing apparatus, whereby said scraper contacts a web supporting surface of the clips as the clips travel past the scraper when the web processing apparatus is in operation.

2. The apparatus according to claim 1, wherein said scraper comprises a blade having a bent front edge.

3. The apparatus according to claim 1, wherein said scraper is positioned such that it is angled with respect to a direction of travel of the clips of the web processing apparatus.

4. The apparatus according to claim 1, wherein said scraper is mounted on a dynamic support, whereby said scraper can move slightly upwardly and downwardly to accommodate variations in position of the clips.

5. The apparatus according to claim 1, further comprising a clip opener for facilitating opening of the clips.

6. The apparatus according to claim 1, wherein said scraper is flexible.

7. The apparatus according to claim 1, further comprising a movable support for selectively positioning the scraper relative to the clips.

8. The apparatus according to claim 1, further comprising a lift for positioning the scraper relative to the clips.

9. A web processing apparatus comprising:

a plurality of clips adapted to hold the sides of a web and travel along an endless pathway including a first web holding pathway section and a second return pathway section, and a clip cleaner comprising a scraper having a substantially planar edge, said scraper being operatively associated with said apparatus such that said substantially planar edge contacts said clips as they travel along said endless pathway to thereby scrape and remove debris therefrom.

10. The apparatus according to claim 9, wherein said scraper is operatively associated with said apparatus such that said substantially planar edge contacts said clips as they travel along the second return pathway section.

11. The apparatus according to claim 9, wherein said scraper is dynamically secured to said apparatus, such that it can move upwardly and downwardly slightly to accommodate variations in position of said clips.

12. The apparatus according to claim 9, wherein said clips include a substantially planar web supporting portion, and said scraper is adapted to scrape the upper surface of said substantially planar web supporting portion of said clips.

13. The apparatus according to claim 9, further comprising a clip opener adapted to facilitate opening of the clips prior to contact by the scraper.

14. The apparatus according to claim 9, wherein said clip cleaner is selectively movable between an operative clip-contacting position and an inoperative position.

15. The apparatus according to claim 9, wherein said scraper is made from a flexible material.

16. The apparatus according to claim 9, further comprising a lift for positioning the scraper relative to the clips.

17. A method of cleaning the clips of a web processing apparatus having a plurality of hinged clips that travel along an endless pathway to carry a web through at least one processing station, said method comprising the step of:

securing to the web processing apparatus a scraper having a substantially planar edge such that said scraper contacts a web supporting portion of said clips as they travel along their endless pathway, to thereby scrape and remove debris therefrom.

18. The method according to claim 17, wherein said step of securing a scraper comprises dynamically mounting said scraper such that said scraper can move slightly upwardly and downwardly to accommodate variations in position of the clips.

19. The method according to claim 17, further comprising the step of opening the hinged clips prior to contacting them with said scraper.

* * * * *